United States Patent
Wagner et al.

(10) Patent No.: US 10,472,770 B2
(45) Date of Patent: Nov. 12, 2019

(54) ELEMENT FOR MANIPULATING LIGHT

(71) Applicant: Carl Freudenberg KG, Weinheim (DE)

(72) Inventors: Rudolf Wagner, Muellheim (DE); Guenter Frey, Schliengen (DE); Klaus Marek, Muellheim (DE); Armin Greiner, Weinheim (DE); Jochen Bialek, Ilvesheim (DE)

(73) Assignee: CARL FREUDENBERG KG, Weinheim (DE)

( * ) Notice: Subject to any disclaimer, the term of this patent is extended or adjusted under 35 U.S.C. 154(b) by 74 days.

(21) Appl. No.: 15/125,196

(22) PCT Filed: Mar. 3, 2015

(86) PCT No.: PCT/EP2015/054354
§ 371 (c)(1),
(2) Date: Sep. 12, 2016

(87) PCT Pub. No.: WO2015/135790
PCT Pub. Date: Sep. 17, 2015

(65) Prior Publication Data
US 2017/0073899 A1    Mar. 16, 2017

(30) Foreign Application Priority Data

Mar. 13, 2014 (DE) .................. 10 2014 003 418

(51) Int. Cl.
*D21H 27/00* (2006.01)
*G02B 5/02* (2006.01)
(Continued)

(52) U.S. Cl.
CPC ............. *D21H 27/00* (2013.01); *D21H 13/14* (2013.01); *D21H 13/24* (2013.01); *F21V 3/06* (2018.02);
(Continued)

(58) Field of Classification Search
CPC ........ D21H 13/14; D21H 13/24; D21H 27/00; F21V 3/06; F21Y 2115/10; G02B 5/0205;
(Continued)

(56) References Cited

U.S. PATENT DOCUMENTS 6,284,680 B1 * 9/2001 Aikawa .................... D04H 1/54
                                                        442/340
9,315,926 B2 * 4/2016 Date ...................... D03D 15/08
(Continued)

FOREIGN PATENT DOCUMENTS

CN         1508576 A    6/2004
CN       101529278 A    9/2009
(Continued)

OTHER PUBLICATIONS

Nobuhiro Matsunaga, "Development of heat-resistant polyester binder fiber "CASVEN"", Sen'I Gakkaishi, vol. 60, No. 10, Dec. 2004, pp. 1-14.

*Primary Examiner* — Tsion Tumebo
(74) *Attorney, Agent, or Firm* — Leydig, Voit & Mayer, Ltd.

(57) ABSTRACT

A wet-laid nonwoven having a1) 5-50 wt % matrix fibers and a2) 50-95 wt % at least partially thermally fused binding fibers or b1) 50-80 wt % matrix fibers and b2) 20-50 wt % binders, can be used as a light distributing element.

14 Claims, 3 Drawing Sheets

(51) Int. Cl.
*D21H 13/14* (2006.01)
*D21H 13/24* (2006.01)
*F21V 3/06* (2018.01)
*F21Y 115/10* (2016.01)

(52) U.S. Cl.
CPC ........... *G02B 5/021* (2013.01); *G02B 5/0205* (2013.01); *G02B 5/0236* (2013.01); *G02B 5/0268* (2013.01); *F21Y 2115/10* (2016.08); *G02B 5/0273* (2013.01)

(58) Field of Classification Search
CPC .... G02B 5/021; G02B 5/0236; G02B 5/0268; G02B 5/0273
See application file for complete search history.

(56) References Cited

U.S. PATENT DOCUMENTS

| | | | |
|---|---|---|---|
| 2005/0032451 A1* | 2/2005 | Kritzer | C04B 30/02 442/327 |
| 2005/0106970 A1* | 5/2005 | Stanitis | D01F 6/12 442/181 |
| 2008/0080055 A1 | 4/2008 | Lightfoot et al. | |
| 2008/0205035 A1* | 8/2008 | Asvadi | G09F 9/33 362/103 |
| 2008/0311350 A1 | 12/2008 | Hanson et al. | |
| 2009/0279018 A1 | 11/2009 | Lin | |
| 2011/0045177 A1 | 2/2011 | Nishimura et al. | |
| 2012/0129032 A1 | 5/2012 | Greiner et al. | |
| 2012/0219728 A1 | 8/2012 | Badri et al. | |
| 2014/0311695 A1* | 10/2014 | Clark | D21H 13/02 162/145 |

FOREIGN PATENT DOCUMENTS

| | | |
|---|---|---|
| DE | 19942989 A1 | 3/2001 |
| DE | 10336380 A1 | 3/2005 |
| JP | S 55103952 A | 8/1980 |
| JP | S 61160483 A | 7/1986 |
| JP | H 05321034 A | 12/1993 |
| JP | H 09190712 A | 7/1997 |
| JP | 2008192406 A | 8/2008 |
| JP | 2008307692 A | 12/2008 |
| JP | 2009244851 A | 10/2009 |
| JP | 2010152189 A | 7/2010 |
| JP | 2013161779 A | 8/2013 |
| KR | 20120102088 A | 9/2012 |
| WO | WO 0118312 A1 | 3/2001 |
| WO | WO 03011063 A1 | 2/2003 |
| WO | WO 2006105836 A1 | 10/2006 |
| WO | WO 2006129246 A2 | 12/2006 |
| WO | WO 2013012974 A1 | 1/2013 |
| WO | WO 2013116193 A1 | 8/2013 |

* cited by examiner

ELEMENT FOR MANIPULATING LIGHT

CROSS-REFERENCE TO RELATED APPLICATIONS

This application is a U.S. national stage application under 35 U.S.C. § 371 of International Application No. PCT/EP2015/054354, filed on Mar. 3, 2015, and claims benefit to German Patent Application No. DE 10 2014 003 418.6, filed on Mar. 13, 2014. The International Application was published in German on Sep. 17, 2015, as WO 2015/135790 A1 under PCT Article 21(2).

FIELD

The invention relates to the method of using a nonwoven as light diffusion element and also to a light source comprising such a light diffusion element.

BACKGROUND

Point-shaped sources of light, for example LED lamps, are an energy-efficient method of illumination in many applications. At the same time, however, it is frequently desired to illuminate an area or room as homogeneously as possible, with uniformly diffused light. Various diffusion media, for example paper, special optical film or textiles, may be used to achieve this objective. There are many applications where further forms of light manipulation, for example light collimation or a certain ratio between reflection and transmission, are desired in addition to a uniform diffusion of light.

Paper diffusion elements are very inexpensive, but their luminance is low. Distinctly higher luminances are achievable by using special optical film. Its disadvantage is that in general it only consists of one type of material. Yet light manipulation often requires the combination of materials having different refractive indices and other properties at very short distances. While the incorporation of additives, the application of subsequent surface treatments or the lamination of multiple layers can be used to engineer specific optical properties into film, this requires further costly processing steps. Multi-ply specialty film, particularly when exposed to heat, further poses the additional problem of potential delamination or deformation due to differences in the thermal expansion coefficients of the materials used.

Against this background, the use of textile materials and particularly nonwovens as light diffusion elements has proved favorable, since the various structural and material compositions are simple to produce in one processing sequence through a suitable selection of fiber blending, web laying and web consolidation. This makes it possible to keep manufacturing costs down compared with other diffusion media while performance is good.

WO 2013/012974 A1 discloses a light source comprising an illuminant, a light guiding plate and a diffusion plate. The diffusion plate may consist of a nonwoven having a certain basis weight.

WO 2013/116193 A1 describes a display system wherein a nonwoven diffusion element is arranged between the light source and the LCD screen.

WO 2006/129246 A2 describes a light source comprising an illuminant arranged on a substrate and a light diffusion element composed of a nonwoven having a specific density setting.

The light system is foregrounded in each of the printed publications cited. Only isolated references are found regarding adjusting the nonwoven properties to optimize the light diffusion properties.

SUMMARY

An aspect of the invention provides a light diffusion element comprising a wet-laid nonwoven comprising: a1) 5-50 wt % of matrix fibers; and a2) 50-95 wt % of at least partly thermally fused binding fibers, or b1) 50-80 wt % of matrix fibers; and b2) 20-50 wt % of binder.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The invention has an aspect to provide a light diffusion element having particularly good light diffusion properties. More particularly, the light diffusion element shall combine very good light intensity diffusions from point- and/or line-shaped sources of light, for example LEDs or CCFLs, with low cost of manufacture.

An aspect of the invention is achieved by employing a wet-laid nonwoven comprising
   a1) 5-50 wt % of matrix fibers and
   a2) 50-95 wt % of at least partly thermally fused binding fibers, or
   b1) 50-80 wt % of matrix fibers and
   b2) 20-50 wt % of binder
as a light diffusion element.

The inventors have found that wet-laid nonwovens having a high proportion of not less than 50 wt % of binding fibers or not less than 20 wt % of binder are very useful as light diffusion elements. The matrix and the binding fibers in the invention are staple fibers. For the purposes of the present invention, staple fibers are to be understood as fibers having a finite length, of preferably 1 mm to 30 mm, as opposed to filaments, which have a theoretically infinite length.

The nonwovens of an aspect of the present invention give surprisingly good light intensity diffusions of point-shaped light sources, for example LEDs. Without wishing to be tied to any one mechanism, the inventors believe that the high luminances are attributable to the fact that the nonwovens, by virtue of their being produced by wet laying, have an extremely homogeneous and isotropic fibrous structure very uniformly consolidated by the high proportion of at least partly fused binding fibers and/or binder. The high proportion of binding fibers and/or binder additionally ensures good face bind of the fibers and uniform binding through the nonwoven across its cross section, as is likewise advantageous in its effect on the luminance.

The binding fibers in the invention are at least partly fused, which likewise has an advantageous effect on the luminance. The binding fibers may have regions that are fused and regions that are not fused. It is preferred for the purposes of the present invention when there are at least some fiber-fiber crossing points, preferably not less than 40% or not less than 50% or not less than 60% or not less than 70% or not less than 80% or not less than 90% of crossing points, where the binding fibers are in a fused state.

Figure 1:
FIG. 1 an SEM picture of a sample according to the invention showing particularly good light intensity diffusion.

Practical tests have shown that particularly good light intensity diffusions are obtainable when, as shown in the SEM picture illustrated in FIG. 1, the nonwoven comprises regions formed by the fused binding fibers at some or all of the fiber-fiber crossing points that are spherical and/or akin to stretched sails. The nature and composition of the fused regions depends on the binding fibers used and also on the production process. When, for example, the binding fibers used are multi-component fibers having binding and non-binding fractions of polymer, it is essentially the binding fractions of polymer which form the fused regions. These fused regions may occur at crossing points of two or more binding fibers and/or at crossing points of binding fibers with matrix fibers. Practical tests have shown according to the present invention that the presence of fused binding fiber regions in the form of spheres and/or akin to stretched sails has an advantageous effect on the luminance diffusion performance of the nonwoven.

Without wishing to be tied to any one mechanism, the inventors believe that these regions are advantageously able to act as light reflection areas. As a result, the luminance diffusion performance of the nonwoven is enhanced by enhancing the proportion of these fused regions. Against this background, preferably not less than 40% or not less than 50% or not less than 60% or not less than 70% or not less than 80% or not less than 90% or essentially all of the crossing points of binding fibers with binding fibers and/or of binding fibers with matrix fibers in the nonwoven comprise regions wherein the fused binding fibers are spherical and/or akin to stretched sails.

Binding fibers may fuse into regions that are spherical and/or akin to stretched sails in the course of thermal consolidation with hot air for example. The temperature parameters and residence times therein are advantageously aligned with the type of binding fibers used and the desired number/extent of the fused regions.

Figure 2:
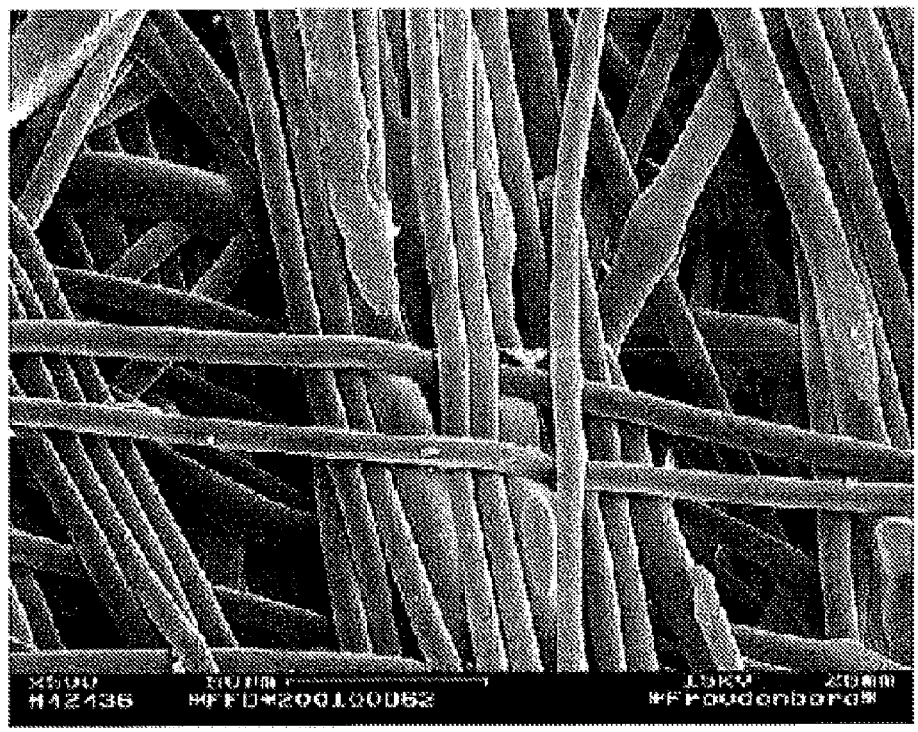
FIG. 2 a fibrous structure of a prior art nonwoven.

FIG. 2 illustrates, for comparison, the fibrous structure of a prior art nonwoven wherein there are no areal fusions between the fibers, instead the fibers merely stick to each other.

A binder used to consolidate the nonwoven is preferably selected such that regions formed by the fused binding fibers at some or all of the fiber-fiber crossing points are spherical and/or akin to stretched sails. Particularly good light intensity diffusions have been found to be obtainable with this embodiment of the invention as well.

The matrix fibers of the present invention are staple fibers. These may be mono- or multicomponent fibers. It may be preferable for reasons of cost to use mono-component fibers. Average fiber lengths are advantageously 1 mm to 30 mm, more preferably from 2 mm to 12 mm and particularly from 3 mm to 6 mm.

Particularly suitable matrix fibers for the purposes of the present invention are fibers having a melting point above the melting point of the binding fibers.

Various staple fibers are usable as matrix fiber in the present invention, examples being fibers that contain and/or consist of polyacrylonitrile, polyvinyl alcohol, viscose, cellulose, polyamides, in particular nylon 6 and nylon-6,6, preferably polyolefins and most preferably polyester, in particular polyethylene terephthalate, polyethylene naphthalate and polybutylene terephthalate, and/or mixtures thereof. Practical tests have shown that fibers containing polyamide, preferably nylon 6, nylon 66, nylon 46, polyacrylonitrile, polycarbonate, viscose and/or lyocell and particularly fibers consisting of the aforementioned polymers or mixtures thereof provide nonwovens having particularly good properties.

In a wet-laid nonwoven having a not less than 50 wt % proportion of binding fibers (option a), the fraction of matrix fibers in the present invention is 5 to 50 wt %, preferably from 5 to 20 wt % and particularly from 5 to 10 wt %, all based on the total weight of the nonwoven.

In a wet-laid nonwoven having a not less than 20 wt % proportion of binding fibers (option b), the fraction of matrix fibers in the present invention is 50 to 80 wt %, preferably from 55 to 75 wt % and particularly from 60 to 70 wt %, all based on the total weight of the nonwoven.

Average linear density of matrix fibers may vary according to the structure desired for the nonwoven. It will prove advantageous to use in particular matrix fibers having an average linear density in the range from 0.06 to 1.7 dtex, preferably from 0.1 to 1.0 dtex.

Practical tests have shown that the use of at least a proportion of microfibers having an average linear density of less than 1 dtex, preferably from 0.1 to 1 dtex as matrix fibers has an advantageous effect on the size and structure of the pore sizes and internal surface area and also the density of the nonwoven. Proportions here of not less than 5 wt %, preferably in the range from 5 to 10 wt %, all based on the total amount of fibers, will be found particularly advantageous here.

The binding fibers used may be the customary staple fibers used for this purpose provided they can be at least partly fused together thermally. Binding fibers may be unitary fibers or else multicomponent fibers. Particularly suitable binding fibers for the purposes of the present invention are fibers having a melting point below the melting point of the matrix fibers to be bound, preferably below 250° C., in particular in the range from 70 to 230° C., more preferably in the range from 125 to 200° C. Suitable fibers are, in particular, thermoplastic polyesters and/or copolyesters, in particular PBT, polyolefins, in particular polypropylene, polyamides, polyvinyl alcohol, or else copolymers and also their copolymers and mixtures.

Particularly suitable binding fibers for the purposes of the present invention are multicomponent fibers, preferably bicomponent fibers, in particular sheath-core fibers. Sheath-core fibers contain at least two fiber-forming polymers differing in softening and/or melting temperature. Sheath-core fibers preferably consist of these two fiber-forming polymers. Of these, the component with the lower softening and/or melting temperature is found at the fiber surface (sheath) and the component with the higher softening and/or melting temperature is found in the core.

The binding function in sheath-core fibers is performable by the materials arranged at the surface of the fibers. Various materials are usable for the sheath. Preferred materials for the sheath in the present invention are polybutylene terephthalate (PBT), polyamide (PA), polyethylene (PE), copolyamides and/or else copolyesters. Various materials are likewise usable for the core. Preferred materials for the core in the present invention are polyester (PES), in particular polyethylene terephthalate (PET) and/or polyethylene naphthalate (PEN) and/or polyolefins (PO).

The use of sheath-core binding fibers is preferable for the purposes of the present invention because a particularly homogeneous distribution of the binder component in the nonwoven is thereby obtainable.

Nonwovens having very good properties were obtained in practical tests with PET-PBT bicomponent fibers and/or PET-CoPES bicomponent fibers. Good results were likewise obtained with fibers from the class of polyolefins, in particular polyethylene-polypropylene bicomponent fibers. PEN-PET bicomponent fibers could be similarly useful.

It is likewise conceivable, however, to use mono-component binding fibers provided these can be at least partly fused together thermally. The choice of mono-component binding fibers depends on the matrix fiber used. For instance, nylon 6 binding fibers are useful for binding nylon 66 matrix fibers and copolyesters are useful for binding polyethylene terephthalate.

Average binding fiber lengths are advantageously 1 mm to 30 mm, more preferably from 1.5 mm to 12 mm and particularly from 3.0 mm to 6.0 mm.

The proportion of binding fibers (option a) in the present invention is 50 to 95 wt %, preferably from 80 to 95 wt % and particularly from 90 to 95 wt %, all based on the total weight of the nonwoven.

Average binding fiber linear density may vary according to the structure desired for the nonwoven. It will prove advantageous to use in particular binding fibers having an average linear density in the range from 0.2 to 2.2 dtex, preferably from 0.8 to 1.3 dtex.

Binding fibers may be thermofused to each other and/or to the matrix fibers of the nonwoven. What will prove particularly advantageous is to consolidate with hot through-flowing air in a hot air belt oven and/or on a drum with a flow of hot air therethrough. Regions formed by fused binding fibers in the present invention are spherical and/or akin to stretched sails.

Thickness calibration may be established between two smooth calendering rolls. The fibers used to produce the nonwoven may in principle have different colors. In a preferred embodiment of the invention, however, white fibers are used.

Fiber cross section irrespective of whether homofil or multicomponent fibers used may be round, oval, surface grooved, star-shaped, ribbon-shaped, tri- or multi-lobal. A round fiber cross section is preferable for the purposes of the present invention.

The fibers making up the wet-laid nonwoven of the present invention may have undergone mechanical or aerodynamic stretching or drawing. Fibers of this type are advantageous in use because oriented fibers have a higher modulus of elasticity and thus higher tensile strength. It is also conceivable to admix drawn fibers with fibers of either the same or a different polymeric construction which have only been drawn partially, if at all.

The bound state of the wet-laid nonwovens obtained with the process of the present invention is preferably the result of thermal binding, in particular by employing binding fibers. However, chemical consolidation of the wet-laid nonwovens is an alternative or additional possibility. In this embodiment of the invention, the weight fraction of the binder is not less than 20 wt %, preferably in the range from 30 to 50 wt %.

Acrylate polymers in particular will prove useful as binders for the use method of the present invention, since their light stability is particularly good. Particular preference here is given to polyacrylic esters prepared from esters of acrylic acid. As a person skilled in the art will know, polyacrylic esters are obtainable via free-radical chain polymerization in aqueous solutions, emulsions (emulsion polymerization) or by bulk polymerization resulting in a powder as end product.

Practical tests have shown that hydrophilic binders combined with the preferred matrix fibers of the present invention are particularly suitable, since the stretched sails they form at the crossing points of fibers are particularly areal, which has an advantageous effect on the light diffusion properties of the nonwoven. As a person skilled in the art will know, the hydrophilicity of a binder can be increased, for example, by admixing wetting agents, for example in order to influence the binder distribution. The presence of emulsifiers and/or wetting agents in the binder dispersion reduces the surface tension, increases the wettability of the binder and thereby improves the film-forming properties. This results in an immense proclivity to form stretched sails at the fiber-fiber crossing points.

A wetting agent is a natural or synthetic substance which, in solution or in mixtures, reduces surface tensions of water or other liquids, enabling these to better penetrate into surfaces of solid bodies and wet and impregnate them by displacement of air.

A preferred wetting agent is selected from the group consisting of ethylene oxide/fatty alcohol ethers, fatty acid ethoxylates, sulfonates, arylsulfonic acids, phosphoric acid ester glycol ethers.

In one preferred embodiment of the invention, the binder contains at least one wetting agent in an amount of not less than 0.5 wt %, preferably from 0.5 wt % to 5 wt %, more preferably from 0.5 wt % to 3 wt % or from 1 wt % to 3 wt %, more preferably from 0.5 wt % to 2 wt %, or from 1 wt % to 2 wt %, more preferably from 0.5 wt % to 1.5 wt % or from 1 wt % to 1.5 wt %, all based on the total amount of the binder.

The polymers used to produce the nonwoven may contain at least one additive selected from the group consisting of color pigments, antistats, or hydro-philicizing or hydrophobicizing additives in an amount of 150 ppm to 10 wt %. The use of said additives in the polymers used enables conformance to customer-specific requirements.

To control the diffusion properties of the nonwoven, the matrix and/or binding fibers may further contain delusterants, such as titanium dioxide. Particularly proportions of 150 ppm to 10 wt % of delusterant, based on the total weight of the nonwoven, will be found advantageous for this purpose.

It is further conceivable to provide the nonwoven a flame-retardant finish, for example with a phosphonic acid derivative. This reduces the risk of fire on contact with hot sources of light.

It is conceivable in principle to employ the nonwoven in the form of a ply assembly. It is thus conceivable that the further plies could be configured as reinforcing plies, for example in the form of a scrim, and/or comprise non-crimp fabrics, knitted fabrics other than those produced by weft knitting with independently movable needles, woven fabrics, nonwoven fabrics and/or reinforcing filaments. However, it is preferable for the purposes of the present invention for the nonwoven to have a single-layered construction, since this avoids optical disruptions due to boundary layer transitions.

To avoid optical disruptions, it is further preferable for the purposes of the present invention for the nonwoven to have an essentially planar surface. In a particularly preferred embodiment of the invention, the surface planarity of the nonwoven is such that three arbitrarily taken samples of the nonwoven differ in thickness, as measured to the EN 29073 Part 2 test method, by not more than 15%, more preferably by not more than 10%.

Basis weights may be established for the nonwoven of the present invention according to the specific intended purpose of use. In one preferred embodiment of the invention, the basis weight of the nonwoven is measured to DIN EN 29073 as advantageously in the range from 50 to 160 g/m$^2$, in particular from 70 to 140 g/m$^2$. It has transpired that sufficient fiber is present in the case of these weight ranges in order to obtain a nonwoven having adequate intrinsic stiffness and a flat position (no dishing). Again, it is advantageous for the nonwoven to have a single-layered construction. This is because single-layered nonwovens have a but minimal dishing proclivity, since no inter-ply stresses arise.

Measured according to the EN 29073 Part 2 test method, the thickness of the nonwoven is preferably from 60 to 180 μm and particularly from 80 to 140 μm.

Practical tests have shown that luminance diffusion improves on increasing the density of the nonwoven. Against this background, the density of the nonwoven (apparent density computed from basis weight and thickness) is preferably not less than 0.4 g/cm$^3$, for example 0.4 to 1 g/cm$^3$, or more preferably from 0.6 to 0.9 g/cm$^3$. The density of the nonwoven is increasable, for example, by densifying, calendering steps in the production process of the nonwoven.

In a preferred embodiment of the invention, the air permeability of the nonwoven as per EN ISO 9237 in a standard atmosphere as per DIN 50014/ISO 554 is from 10 to 600 dm$^3$/s*m$^2$.

The porosity of the nonwoven—as computed from the thickness, the weight and the densities of the materials used ($P=(1-FG/d \cdot \& \; \delta)) \cdot 100$, where FG is the basis weight in kg/m$^2$, d is the thickness in m and δ is the density in kg/m$^3$)—is preferably from 40 to 60%.

The nonwoven of the present invention is a wet-laid nonwoven obtainable with a wet-laid process. To obtain as homogeneous and isotropic a nonwoven as possible, the fibers are advantageously efficiently commixed and uniformly distributed before fiber laying.

The wet-laid nonwoven of the present invention is obtainable by a process comprising the steps of:
  forming an aqueous fibrous dispersion by dispersing a fiber mixture comprising matrix fibers and optionally binding fibers in an aqueous medium;
  dewatering the fibrous dispersion to form a wet-laid web;
  drying, thermally binding and calendering the wet-laid web in order to consolidate it into a wet-laid nonwoven and establish its thickness.

The step of forming the aqueous fibrous dispersion may be effected in the conventional manner of the wet-laid nonwoven production arts by mixing the fibers with water.

To form the fibrous dispersion, the binding fibers and the matrix fibers are each preferably used in an amount such that the ratio of binding fibers and matrix fibers in the fibrous dispersion is in the range from 1:1 up to 20:1, preferably from 5:1 up to 10:1.

The fibrous dispersion, in addition to the binding fibers and matrix fibers, may additionally contain further components, for example marking agents, binders and/or customary added-substance materials, for example spinning aids.

The step of dewatering the fibrous dispersion to form the wet-laid web may likewise be effected in a conventional manner of the wet-laid nonwoven manufacturing arts, for example by applying the mixture to a wire screen and sucking off water.

Web formation may be followed by a drying and/or preconsolidating step, for example via drums with hot air. Temperatures here may be in the range from 100 to 225° C.

The as-formed and optionally preconsolidated nonwoven may subsequently be calendered. Calendering causes compaction of the wet-laid nonwoven with or without autogenous fusion of the fibers, or fiber constituents, melt-activated under consolidation conditions.

Calendering is effected by heat and pressure. Suitable temperatures generally range from 100 to 250° C. according to the type of fibers used for producing the wet-laid nonwoven.

When polyolefin fibers are used, calendering temperatures of typically 100 to 160° C. are used according to the particular olefinic fiber or fiber component used. Calendering conditions must be very specifically aligned with the melting and softening behavior of the polymers used in an individual case. When polyester-binding fibers are used, calendering temperatures are typically 170 to 230° C.

A calender consists in principle of two smooth rolls. In individual cases when a textured surface is desired, it is also possible to use a roll having an embossing pattern.

In a preferred embodiment of the invention, the step of calendering and/or preconsolidating the nonwoven is carried out so as to achieve an at least partial melting of the binding fibers enabling the binding fibers to fuse into regions that are spherical and/or akin to stretched sails. Advantageously, the pressure and/or temperature parameters of the calendering and/or preconsolidating step and also its duration are aligned with the nature of the fibers used and with the desired number and/or extent of the fused regions.

The microfiber composite nonwoven of the present invention is very useful as a light diffusion element. The present invention further provides a light source comprising at least an illuminant and a nonwoven as described above, as a light diffusion element.

Useful illuminants include in particular point-shaped sources of light, such as LEDs and/or linear sources of light such as CCFLs "Cold Cathode Fluorescent Lamps". LEDs are light-emitting diodes capable of emitting light in wavelength ranges from infrared to UV. LEDs are to be understood as referring to the various types of light-emitting diodes, including organic, inorganic or laser-based diodes.

The light source of the present invention is useful for various purposes of illumination, for example for room illumination and/or communication. In a preferred embodiment of the invention, the light source is used for background illumination of liquid crystal displays (LCDs).

The invention will now be more particularly elucidated by means of several examples.

Example 1: Production of Wet-Laid Nonwoven 1

Wet-laid nonwoven 1, which is in accordance with the present invention, is produced in a wet-laid process to a basis weight of 80 g/m$^2$ from 90 wt % of polyester-copolyester core-sheath fibers 1.5 dtex/6 mm and 10 wt % of polyester matrix fibers 1.1 dtex/6 mm. Consolidation is effected by means of hot air in a throughflow dryer. Thickness is established at 110 μm by pressing between smooth calendering rolls.

Example 2: Production of Wet-Laid Nonwoven 2

Wet-laid nonwoven 2 is produced in a wet-laid process to a basis weight of 95 g/m$^2$ from 80 wt % of polyolefin core-sheath fibers 1.1 dtex/4 mm and 20 wt % of polypropylene matrix fibers 0.8 dtex/5 mm. Consolidation is effected by means of hot air in a throughflow dryer. Thickness is established at 125 μm by pressing between smooth calendering rolls.

The nonwovens of the present invention are notable for a high proportion of binding fibers. These have partly fused at the fiber-fiber crossing points into regions that are spherical and/or akin to stretched sails.

Example 3: Production of Nonwoven 3

Wet-laid nonwoven 3 is produced in a wet-laid process to a basis weight of 100 g/m² from 50 wt % of amorphous polyester binding fiber 1.7 dtex/12 mm and 50 wt % of polyester matrix fibers 0.5 dtex/3 mm. Consolidation is effected via heated calendering rolls, concurrently establishing a thickness of 150 μm.

This type of nonwoven has no significantly fused regions, instead the fibers stick to each other in their original form.

Example 4: Measurement of Luminance Diffusion by Nonwovens

Figure 3:
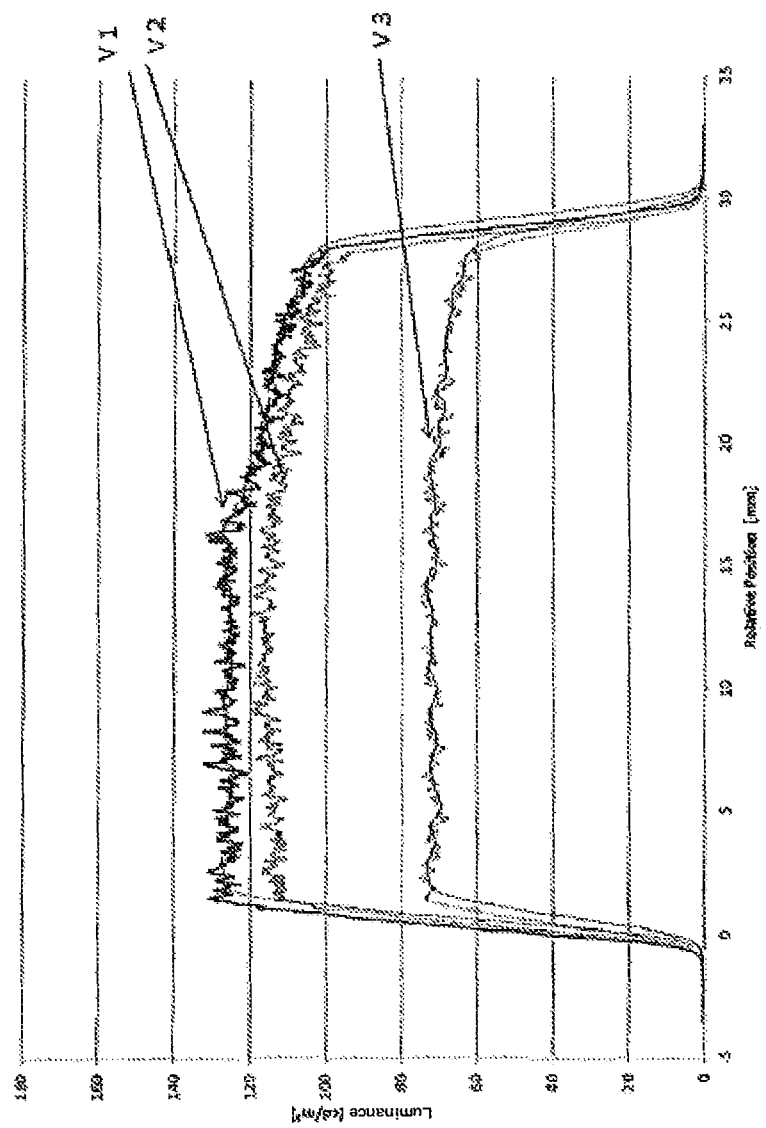
FIG. 3 a juxtaposition of the luminance diffusion of inventive nonwovens 1 (V1) and 2 (V2) with non-inventive nonwoven 3 (V3) for comparative purposes.

FIG. 3 juxtaposes the luminance diffusion of inventive nonwovens 1 (V1) and 2 (V2) with non-inventive nonwoven 3 (V3) for comparative purposes. It is clearly seen that inventive nonwovens 1 and 2 have a significantly higher luminance, namely some 50 cd/m² higher than that of non-inventive nonwoven 3.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A light diffusion element comprising a wet-laid nonwoven comprising:
   a1) 5-20 wt % of matrix fibers; and
   a2) 80-95 wt % of at least partly thermally fused binding fibers, based on the total weight of the nonwoven,
   wherein the matrix fibers comprise not less than 5 wt % of microfibers having an average linear density of less than 1 dtex, based on a total amount of fibers,
   wherein the binding fibers comprise sheath-core fibers, and
   wherein the fused binding fibers form regions acting as light reflection areas at some or all fiber-fiber crossing points in the nonwoven which are spherical or akin to stretched sails.

2. The element of claim 1, wherein the matrix fibers comprise a polyester, polyamide, polyacrylonitrile, polycarbonate, polyvinyl alcohol, polyolefin, viscose, lyocell, or a mixture of two or more of any of these.

3. The element of claim 1, wherein the binding fibers comprise PET-PBT bicomponent fibers, PET-CoPES bicomponent fibers, PEN-PET bicomponent fibers, polyethylene-polypropylene bicomponent fibers, or a mixture of two or more of any of these.

4. The element of claim 1, wherein not less than 40% of the crossing points comprise regions wherein the fused binding fibers are spherical and/or akin to stretched sails.

5. The element of claim 1, wherein a matrix of the nonwoven and/or the binding fibers comprise a delusterant.

6. The element of claim 1, wherein the nonwoven comprises a phosphic acid derivative to provide a flame-retardant finish.

7. The element of claim 1, wherein the nonwoven has a single-layered construction.

8. The element of claim 1, wherein a density of the nonwoven computes from basis weight and thickness to not less than 0.4 g/cm³.

9. The element of claim 1, wherein the nonwoven has an air permeability, as per EN ISO 9237 in a standard atmosphere as per DIN 50014/ISO 554, of from 10 to 600 dm³/s*m² at 2 mbar.

10. A method of diffusing light, comprising contacting light with the light diffusion element of claim 1.

11. The element of claim 1, wherein the matrix fibers consist essentially of a polyester, polyamide, polyacrylonitrile, polycarbonate, polyvinyl alcohol, polyolefin, viscose, lyocell, or a mixture of two or more of any of these.

12. The element of claim 1, wherein the matrix fibers comprise nylon 6, nylon 66, nylon 46, polypropylene, or a mixture of two or more of any of these.

13. A light source, comprising:
   an illuminant; and
   a light diffusion element comprising a wet-laid nonwoven comprising:
   a1) 5-20 wt % of matrix fibers; and
   a2) 80-95 wt % of at least partly thermally fused binding fibers, based on the total weight of the nonwoven,
   wherein the matrix fibers comprise not less than 5 wt % of microfibers having an average linear density of less than 1 dtex, based on a total amount of fibers,
   wherein the binding fibers comprise sheath-core fibers, and
   wherein the fused binding fibers form regions acting as light reflection areas at some or all fiber-fiber crossing points in the nonwoven which are spherical or akin to stretched sails.

14. The light source of claim 13, wherein the illuminant includes a point-shaped light source, a linear light source, or two or more of any of these.

* * * * *